US012633745B2

(12) United States Patent
Dürr

(10) Patent No.: US 12,633,745 B2
(45) Date of Patent: May 19, 2026

(54) METHOD AND DEVICE FOR PREDICTING AN ENERGY SERVICE OFFERING AND SOFTWARE PROGRAM PRODUCT

(71) Applicant: Siemens Aktiengesellschaft, Munich (DE)

(72) Inventor: Matthias Dürr, Nuremberg (GB)

(73) Assignee: Siemens Aktiengesellschaft, Munich (DE)

( * ) Notice: Subject to any disclaimer, the term of this patent is extended or adjusted under 35 U.S.C. 154(b) by 511 days.

(21) Appl. No.: 18/016,724

(22) PCT Filed: Jul. 23, 2020

(86) PCT No.: PCT/EP2020/070804
§ 371 (c)(1),
(2) Date: Jan. 18, 2023

(87) PCT Pub. No.: WO2022/017606
PCT Pub. Date: Jan. 27, 2022

(65) Prior Publication Data
US 2023/0299584 A1 Sep. 21, 2023

(51) Int. Cl.
*H02J 3/00* (2026.01)
*G05B 15/02* (2006.01)
(Continued)

(52) U.S. Cl.
CPC .............. *H02J 3/003* (2020.01); *G05B 15/02* (2013.01); *G05F 1/66* (2013.01); *H02J 3/17* (2026.01);
(Continued)

(58) Field of Classification Search
CPC ... H02J 3/003; H02J 3/144; H02J 3/28; G05B 15/02; G05F 1/66
(Continued)

(56) References Cited

U.S. PATENT DOCUMENTS 7,881,889 B2 2/2011 Barclay et al.
8,670,874 B2 3/2014 Edwards
(Continued)

FOREIGN PATENT DOCUMENTS

CN 107895241 A * 4/2018 ............. G06Q 50/06
CN 110635476 A 12/2019
(Continued)

OTHER PUBLICATIONS

PCT International Search Report and Written Opinion of International Searching Authority mailed Apr. 19, 2021 corresponding to PCT International Application No. PCT/EP2020/070804.
(Continued)

*Primary Examiner* — Crystal J Barnes-Bullock
(74) *Attorney, Agent, or Firm* — Lempia Summerfield Katz LLC

(57) ABSTRACT

A predictor that projects the service offering available at a point in time on the basis of the agreed technical and contractual rules is provided. The predictor further makes the same available to the operating and scheduling systems of the industrial company and optimizes the prediction parameters by observing and comparing the real situation with the calculated situation, or else indicates unused potential.

16 Claims, 2 Drawing Sheets

(51) Int. Cl.

| | |
|---|---|
| *G05F 1/66* | (2006.01) |
| *H02J 3/17* | (2026.01) |
| *H02J 3/28* | (2006.01) |
| *H02J 105/12* | (2026.01) |
| *H02J 105/52* | (2026.01) |

(52) U.S. Cl.
CPC ............. *H02J 3/28* (2013.01); *H02J 2105/12* (2026.01); *H02J 2105/52* (2026.01)

(58) Field of Classification Search
USPC ........................................................ 700/291
See application file for complete search history.

(56) References Cited

U.S. PATENT DOCUMENTS

| | | | | |
|---|---|---|---|---|
| 9,633,401 | B2 | 4/2017 | Curtis | |
| 11,029,652 | B2 * | 6/2021 | Blackhall | ............. G05B 13/041 |

| | | | | | |
|---|---|---|---|---|---|
| 2017/0038786 | A1 | | 2/2017 | Asghari et al. | |
| 2021/0044109 | A1 | | 2/2021 | Spiecker | |

FOREIGN PATENT DOCUMENTS

| | | | | | | |
|---|---|---|---|---|---|---|
| DE | 102006002407 | A1 | * | 7/2007 | ............. | B60R 16/03 |
| DE | 202017007300 | U1 | * | 9/2020 | ............... | H02J 3/14 |
| EP | 3561983 | A1 | | 10/2019 | | |
| ES | 2622113 | T3 | * | 7/2017 | ............... | G05F 1/66 |
| KR | 20210042898 | A | * | 4/2021 | ............. | G06N 3/044 |
| WO | 2006037734 | A2 | | 4/2006 | | |
| WO | 2019206473 | A1 | | 10/2019 | | |

OTHER PUBLICATIONS

Wen Jianfeng et al., "Analysis on Charging Demand of EV Based on Stochastic Simulation of Trip Chain," Power System Technology, vol. 39 No. 6, Jun. 2015, pp. 1477-1484.

* cited by examiner

METHOD AND DEVICE FOR PREDICTING AN ENERGY SERVICE OFFERING AND SOFTWARE PROGRAM PRODUCT

The present patent document is a § 371 nationalization of PCT Application Serial No. PCT/EP2020/070804, filed Jul. 23, 2020, designating the United States, which is hereby incorporated by reference.

TECHNICAL FIELD

Electric power is used in everyday life and domestically to supply energy to many items of electronic, electrical and electromechanical equipment, and installations of all sizes, for example, domestic appliances in private households, a growing number of bicycles equipped with an electric motor, cars, and other vehicles through to industrial production plants.

BACKGROUND

The electricity is provided for use, and the service offer may be restricted. In the case of a private consumer, for example, in a residence, e.g., a standard (16A) fuse thus limits the power to 3.68 kilowatts. How much of this maximum power is actually requisitioned for how long is totally irrelevant to the provision of this power. Electricity demand beyond this service offer cannot be covered.

This service offer by the grid may be adequate for a private consumer, well protected, and provision is clearly regulated with the electricity supplier.

The situation is different in energy-intensive industry, however, for which an electricity supply provided as a maximum may mean a limitation for the production capacity of the production plant.

One big problem is an increasingly unstable energy supply. There is now a desire for large industrial firms to temporarily reduce their consumption in order to prevent the grid from collapsing. This is also due to very complex networking of the consumers and increasing energy consumptions of all subscribers, as a result of the use of more and more electrical assistants, now including assistants that act autonomously, meaning that it is sometimes scarcely possible to predict the time at which electricity is demanded. Also, the rising demand for a greater number of charging options for electric vehicles should not be forgotten, for example.

There are more or less complex contractual models from the energy suppliers that the industrial firms may use to submit to the total electricity demand, this then being rewarded with attractive bonuses.

If, for example, many private households begin to significantly increase electricity demand more or less simultaneously in the evening, by watching television or using the Internet, (for example, streaming, cooking, or using other domestic appliances), the industrial firm with the high electricity demand then shuts down its energy-intensive production plants for a stipulated period of time, as far as is actually possible in the networked and complex production process, and thus limits its requisitioning of power in this period of time and receives a bonus for this.

This may have adverse consequences for the energy budget of the industrial production plant, however. For example, an electric steel furnace requires more energy to start up again than was saved in the preceding passive phase in order to prevent the electricity supply grid from collapsing. Production-related long-term energy consumption forecasts are not taken into account.

For the industrial firm, this means that the available power is decreased by the energy supplier, or a minimum power needs to be drawn, and the firm needs to compensate for this in order to receive the financial advantages guaranteed by the contract. At some point, it will become doubtful whether the financial incentives thus received are still an advantage when everything is taken into account.

While a maximum power up to which a consumer has been able to requisition energy has hitherto been agreed with the energy supply company (EVU, possibly also in conjunction with the grid operator) when drafting contracts, models are thus increasingly appearing in which the energy supplier provides the consumer with financial advantages if it adapts its behavior according to needs of the EVU. This may be done in the form of seasonal and daytime restrictions (e.g., atypical grid use), avoidance of power peaks when receiving large amounts of energy over long periods of time (e.g., intensive grid use), or short-term load shedding at the request of the EVU (e.g., balancing energy requisition). In fact, it may also become necessary not just to limit the power drawn but rather to draw a minimum power, for example, if particularly good weather results in there being an increased supply of current by connected solar installations or wind power installations.

The problem is solved today firstly by using consultants, who, given imminent decisions such as, for example, in the case of investments, when signing supply contracts or taking part in load limiting measures, take existing data as a basis for performing model calculations and delivering recommendations.

More complex models are likely to be avoided in this case, because the risks for industrial production as a result of production outages in the event of an error in the calculation are regarded as being too high compared to the possible savings.

The prior art, (for example, U.S. Pat. Nos. 9,633,401, 8,670,874, or U.S. Pat. No. 7,881,889B2), discloses prediction and optimization methods, but these all work on the basis of energy consumption forecasts for the existing consumers.

In the context of switching over the energy supply toward nondeterministic energy sources, measures for dynamic load matching at the consumer end are increasingly in the foreground, in particular in the industrial sector, as already described above.

SUMMARY

It is an object of the disclosure to specify a method that overcomes the challenges described above.

The scope of the present disclosure is defined solely by the appended claims and is not affected to any degree by the statements within this summary. The present embodiments may obviate one or more of the drawbacks or limitations in the related art.

The method for predicting an available energy service offer or existing energy service limits at a later time or over a period of time includes: ascertaining the maximum available supply power at the time or in the period of time; modelling individual conditions that influence the energy service offer; calculating a superposition by overlaying the individual conditions; and thus ascertaining a power range at the wanted time.

The problem is solved by using a predictor that predicts the service offer available at a time and the existing service limits on the basis of the agreed technical and contractual rules, makes them available to the operating and planning systems of the industrial firm and, through observation and comparison of the real situation with the computed situation, optimizes the prediction parameters, or also suggests unused potentials.

Superposition is also known as the overlay principle. This involves obtaining a result by overlaying two identical physical variables without mutual impairment. Superposition is applied to linear problems in many areas such as mathematics, physics and electrical engineering.

The object is also achieved by a computer program product and a device as described herein.

An automated forecast for service restrictions is delivered.

The challenge in this case is that the previously simple ascertainment of the power available for the consumer at a time now gives way to partially complex ascertainment of the available power that is dependent on times, past history and linked conditions.

A service predictor device ascertains a superposition for an overall statement for a time x from a set of individual conditions for the guaranteed power through weighting.

BRIEF DESCRIPTION OF THE DRAWINGS

The disclosure is also described by the figures, in which.

DETAILED DESCRIPTION

Figure 1:
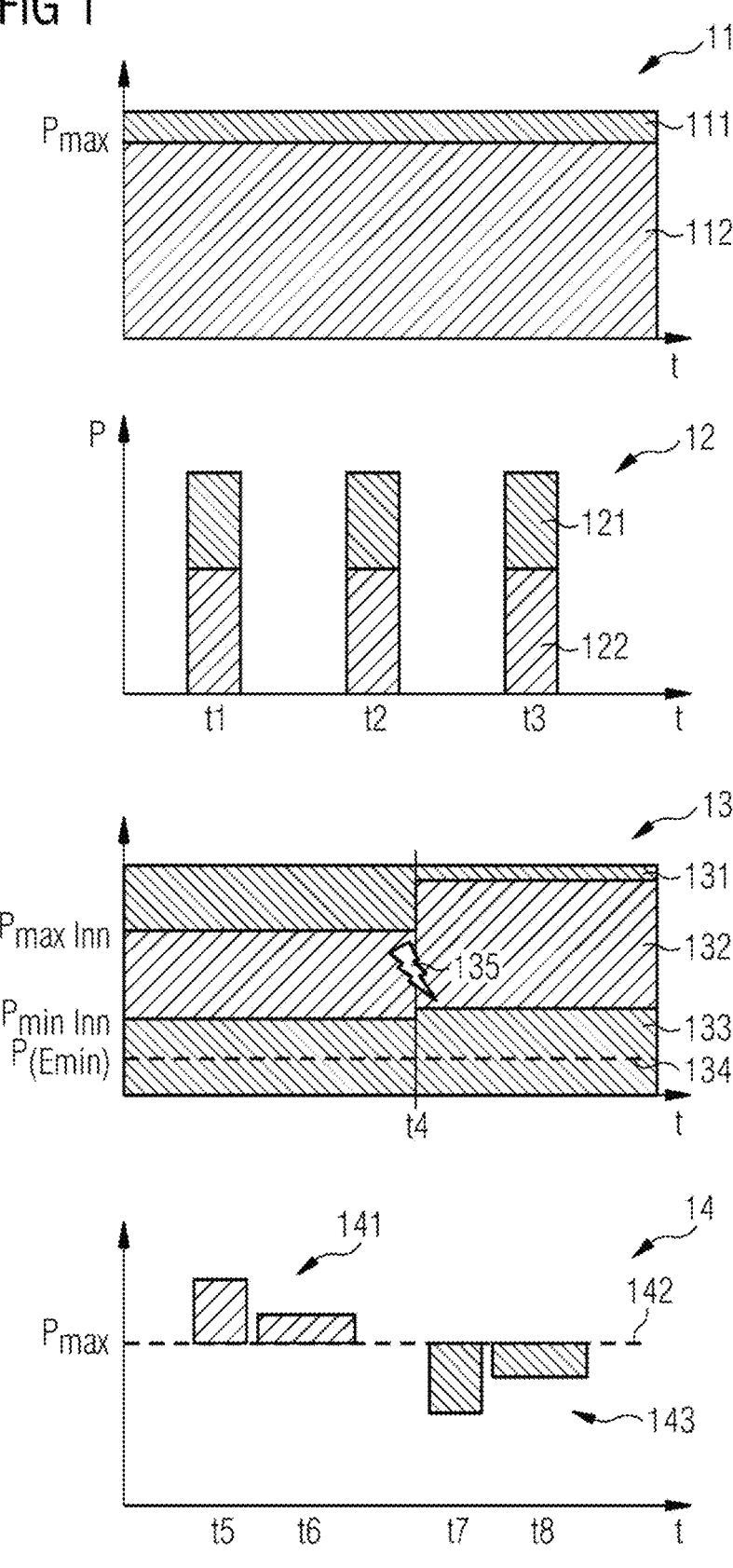
FIG. 1 depicts examples of illustrative individual conditions to be taken into consideration.

FIG. 1 shows illustrative individual conditions over a timeline t.

The first graph 11 shows a constant maximum supply power Pmax, as agreed with the EVU; in the area 112, the user is "in the green area", where it complies with its part of the contract with the energy supplier. As soon as consumption moves into the area 111, the actually guaranteed supply power Pmax is exceeded, which may lead to disadvantages, be they of a technical character, if the service offer of the electricity grid is no longer adequate, or of a financial nature due to penalty levies on the electricity price.

Graph 12 shows a seasonal and daytime limitation in accordance with a contractual model "atypical grid use", that is to say service limitation during daily or otherwise regularly recurring predictable peak times t1, t2, t3. It shows not the power consumption that has actually taken place or is actually to be expected, but rather the energy level that the energy supplier is willing or able to deliver at said time. Here too, the area 122 shows the permitted usage area and 121 shows the excess. These may be recurring events (evening) or days with peak events that mean that the behavior of the subscribers in the electricity supply grid changes and that cause the electricity supplier to have to control the drawing of power as appropriate.

Graph 13 shows avoidance of load peaks based on a high annual total amount of energy according to the contractual model "intensive grid use". Graph 13 also introduces a minimum draw amount 133. At the time t4, unplanned electricity consumption 135 now occurs, for example, which leads to the available amount of power being exceeded. As a consequence, the minimum threshold is raised to reach the limit for annual hours of use (7000 h) after the previously obtained maximum power is exceeded at this time t4. Not only is a maximum supply power Pmax indicated here, but also a minimum draw amount P (Emin) 134, and so the intended consumption 132 is between excess 131 and shortfall 133.

Further margins may be obtained through the employment of private stores or the internal generation of one's own electricity, for example as a result of the installation of solar cells or wind power installations, as indicated in the bottom graph 14. If the externally supplied power is exceeded internally, or the internally available power is reduced as a result of a need to recharge, these surpluses may also be used to fill the store, 141, in order to supply the thus stored energy to the system in question again as required 143. Applicable values are sometimes not as easy to ascertain, depending on the performance of the electricity generator, for example the presence of sufficient wind in the case of wind power, or the same for solar cells. The delivery of energy held in a store does not occur linearly either, but rather according to the technical properties of the store that is used.

Further conditions may arise e.g. from participation in contractual models for providing balancing energy (short-term/brief load shedding), employment of private power stations or participation in energy trade.

An important consideration in this case is that not only is the maximum drawable power (Pmax) 142 significant here but also a possible minimum power to be drawn.

Figure 2:
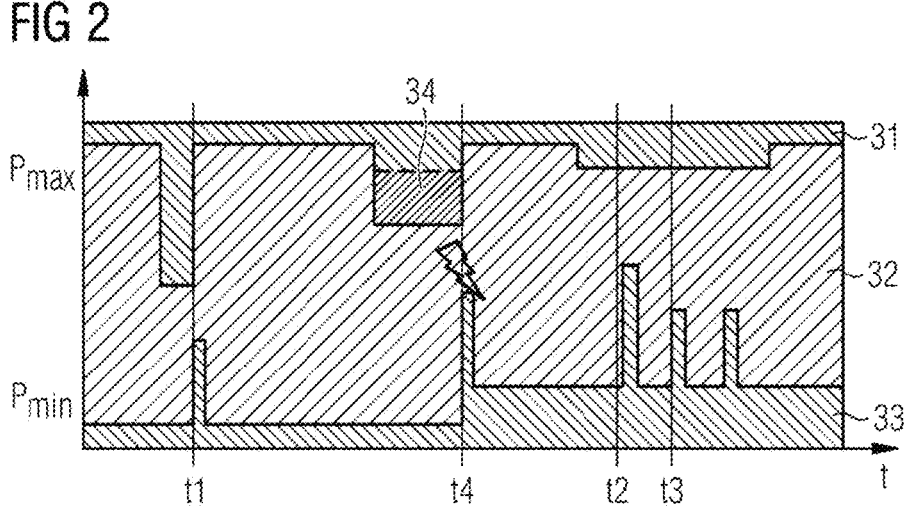
FIG. 2 depicts logic for a service predictor according to an example.

After the individual conditions have been modelled, superposition is carried out, which involves the individual conditions for each time being overlaid and in this way a power range 32 being ascertained, between the minimum power 33 and the maximum power 31. This result is shown by way of illustration in FIG. 2. The times t1 to t3 again have, as in the case of 12, the restrictions according to the contractual model "atypical grid use". At t4, the minimum draw amount is raised according to the contractual model "intensive grid use" after an unplanned consumption; this would be an opportunity for example to use additional internal electricity generation to "expand" the green area 132 for the applicable time or period of time in order to afford the electricity consumer greater latitude. This is indicated schematically by the shaded area 34.

In an advantageous configuration of the disclosure, the individual conditions may be provided with weightings. A decreased weighting for the power of a store would be conceivable, because here there are degrees of freedom with regard to the use, and logic rules may be applied. Condition B makes sense only if A is satisfied, but not C. An example would be that a store may be taken into consideration in the calculations of the service offer only if it has also been able to be charged beforehand.

A dynamic, (e.g., time-dependent), weighting (e.g., values that are closer in time have greater weight) makes sense in particular if the conditions become "harder" with increasing proximity to the time of execution, because, e.g., a probability of a partial service being available is substantiated, in a similar manner to a "sales funnel".

Figure 3:
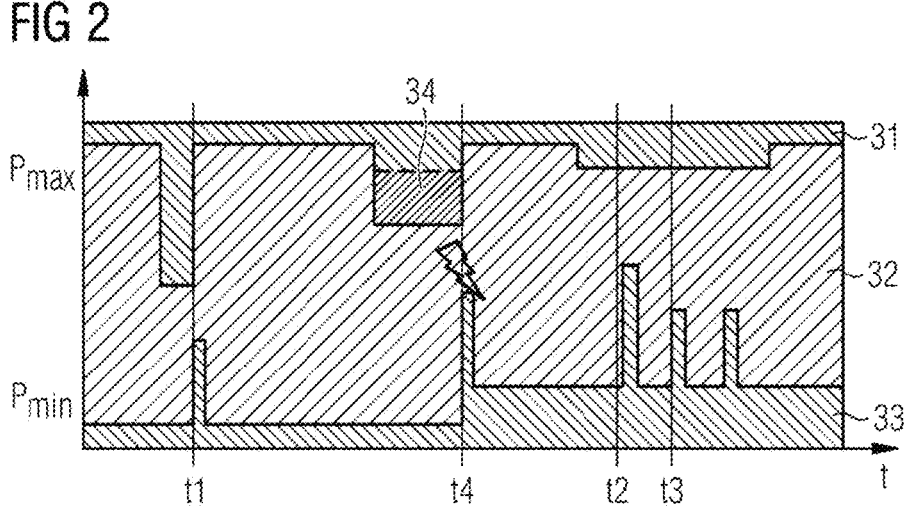
FIG. 3 depicts an examples of an ascertainment of the service predictor with weighting of the individual conditions.

The service predictor may be used as indicated in FIG. 3. It provides the limit values of the available service window for the operational planning and control tools for times x on the timeline t—including real-time calculation; this fulfils a prior condition for the dynamic adaptation of operational planning according to the supply situation without disproportionately large reserves needing to be held. The systems in an industrial plant that are then able to work with such information are, for example, an ERP 313, MES 314, PCS 315, or the logistics 316.

In a refined form, the circumstances that are actually observed are fed back 319 to the predictor 311 with the aim of optimizing in particular the weightings in a control loop.

To this end, the events that are actually observed are fed back to the predictor 311 via a correction function 312 so as to achieve an optimization. This may be done, e.g., in the form that a failure in the expected supply by the store decreases the weighting thereof for future predictions. Another example would be that if, for example, the conditions for the "intensive grid use" may no longer be achieved in an appropriate manner, the weighting of this contractual model is set to zero.

A final example would be the need to purchase more power in the short term because the prediction was incorrect.

A particularly advantageous embodiment of the correction function is obtained for a large number of rule and weighting changes (for example, as a result of participation in energy trade) through the use of machine learning in conjunction with a neural network, for example in a (trade) scenario in which constantly changing probabilities would arise for the available power.

One advantage of the disclosure is making the advantages of dynamic EVU contractual models continuously available in industrial applications and reducing the need to hold large reserves as a result of uncertainty.

This is made possible by automated ascertainment of the service limits available at times t1, t2, . . . , even in the case of multiple and/or more complex contractual models, or trade scenarios in which changing powers with different probability of availability need to be taken into consideration. In particular in the last scenario, employing feedback based on machine learning in conjunction with a neural network is a useful extension.

Advantages arise from additional up-to-date functions for products such as "power rate", "energy suite", or energy storage solutions.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for predicting an available energy service offer or existing energy service limits at a time or over a period of time, the method comprising:

ascertaining a maximum available supply power at the time or in the period of time;

dynamically modelling, by a rule generator of a device, individual conditions that influence the energy service offer to provide modelled conditions, wherein the modelled conditions that influence the service offer are weighted, and wherein the weighting of the modelled conditions that influence the service offer is dynamically applied so that the condition is provided with a higher weighting with increasing proximity to the time of execution;

calculating, by a predictor of the device, a superposition by overlaying the individual conditions; and ascertaining, by the predictor, a power range at the time or the period of time using the dynamic modelling, therein reducing an amount of energy reserves needed to be held by an industrial production plant in comparison to an industrial production plant having no dynamic modelling.

2. The method of claim 1, wherein the conditions that influence the energy service offer are a limitation based on an atypical grid use that takes place at regularly occurring recurrent times.

3. The method of claim 1, wherein service limits that adversely affect use of the maximum service offer are taken into consideration, and wherein an exceeding of a previous maximum service offer leads to adaptation of previously set conditions.

4. The method of claim 1, wherein a condition that influences the energy service offer is an employment of available energy stores or a possibility of internal supplementation of the energy service offer.

5. The method of claim 1, wherein the modelled conditions that influence the service offer are applied based on logic rules.

6. The method of claim 1, wherein an actually available power range at the time or the period of time is compared with the power range ascertained by prediction, and wherein a difference in the comparison, together with events that influence the power range, is fed back via a correction function.

7. The method of claim 6, wherein, when an expected supply by a store or an internal electricity generator at the time or the period of time is not achieved, a weighting of the modelled conditions that influence the service offer is decreased for future predictions.

8. The method of claim 1, further comprising:

providing energy, by the industrial production plant, based on the ascertained power range.

9. A device for predicting an available energy service offer or existing energy service limits at a time or over a period of time, the device comprising:

a rule generator configured to dynamically model individual conditions that influence the energy service offer, wherein the modelled conditions that influence the service offer are weighted, and wherein the weighting of the modelled conditions that influence the service offer is dynamically applied so that the condition is provided with a higher weighting with increasing proximity to the time of execution; and a predictor configured to:

calculate a superposition based on a maximum available supply power at the time or in the period of time by overlaying the individual conditions with a power range available at the time or the period of time; and ascertain the power range at the time or the period of time using the dynamic model, therein reducing an amount of energy reserves needed to be held by an industrial production plant in comparison to an industrial production plant having no dynamic modelling.

10. The device of claim 9, wherein the rule generator is configured to take into consideration a limitation based on an atypical grid use that takes place at regularly occurring recurrent times for the individual conditions that influence the energy service offer.

11. The device of claim 9, wherein the rule generator is configured to take into consideration service limits that adversely affect use of a maximum service offer for the individual conditions that influence the energy service offer, and wherein an exceeding of a previous maximum service offer is configured to lead to an adaptation of previously set conditions.

12. The device of claim 9, wherein the rule generator is configured to take into consideration that the available energy service offer is influenced by an internally connectable energy supply through an employment of available previously stored energy or internal supplementation of the energy service offer by power generation.

13. The device of claim 9, wherein the rule generator is configured to apply the modelled conditions based on logic rules.

14. The device of claim 9, further comprising:

a corrector configured to compare, by prediction, an actually available power range at the time or the period of time with the power range ascertained for the time or the period of time, and wherein a difference in the comparison, together with events that influence the power range, are configured to be fed back to the rule generator.

15. The device of claim 14, wherein the corrector is further configured to detect a difference between an expected supply and an actual supply by a store or an internal electricity generator at the time or the period of time, and wherein a weighting of the modelled conditions that influence the service offer is configured to be decreased for future predictions.

16. The device of claim 9, wherein energy is configured to be provided by the industrial production plant based on the power range.

\* \* \* \* \*